(12) United States Patent
Bousset et al.

(10) Patent No.: US 11,130,474 B2
(45) Date of Patent: Sep. 28, 2021

(54) END PIECE FOR A WIPER BLADE

(71) Applicant: Valeo Systèmes d'Essuyage, Le Mesnil Saint Denis (FR)

(72) Inventors: Xavier Bousset, Issoire (FR);
Guillaume Barret, Issoire (FR);
Vincent Gaucher, Issoire (FR);
Stéphane Houssat, Issoire (FR);
Olivier Jomard, Issoire (FR); Denis Thebault, Issoire (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 95 days.

(21) Appl. No.: 16/498,834

(22) PCT Filed: Mar. 27, 2018

(86) PCT No.: PCT/EP2018/057831
§ 371 (c)(1),
(2) Date: Sep. 27, 2019

(87) PCT Pub. No.: WO2018/178110
PCT Pub. Date: Oct. 4, 2018

(65) Prior Publication Data
US 2021/0107432 A1 Apr. 15, 2021

(30) Foreign Application Priority Data

Mar. 27, 2017 (FR) ...................................... 1752534

(51) Int. Cl.
*B60S 1/34* (2006.01)
*B60S 1/38* (2006.01)
*B60S 1/52* (2006.01)

(52) U.S. Cl.
CPC ........... *B60S 1/3887* (2013.01); *B60S 1/3891* (2013.01); *B60S 1/3894* (2013.01); *B60S 1/524* (2013.01)

(58) Field of Classification Search
CPC ......... B60S 1/38; B60S 1/3891; B60S 1/3894
See application file for complete search history.

(56) References Cited

U.S. PATENT DOCUMENTS 8,959,700 B2 * 2/2015 Yoshimoto ............ B60S 1/3881
15/250.201
2008/0289134 A1 11/2008 Boussicot et al.
(Continued)

FOREIGN PATENT DOCUMENTS

DE 102011078172 A1 1/2013
WO WO-2012130797 A1 * 10/2012 ............ B60S 1/3896
WO 2018/041703 A1 3/2018

OTHER PUBLICATIONS

International Search Report and Written Opinion in corresponding International Application No. PCT/EP2018/057831, dated Jun. 5, 2018 (9 pages).

*Primary Examiner* — Michael D Jennings
(74) *Attorney, Agent, or Firm* — Osha Bergman Watanabe & Burton LLP

(57) ABSTRACT

The invention relates to a terminal end piece (8) for a wiper blade. The terminal end piece (8) comprises a peripheral wall (20) which separates an external environment of the terminal end piece (8) from an internal space (11) of the terminal end piece (8). The terminal end piece (8) delimits a first housing (21) which is arranged in the internal space (11) and which extends primarily in a first plane (P1). A second housing (22) is interposed between the peripheral wall (20) and the first housing (21). The terminal end piece (8) comprises at least one locking member (37) which is configured to connect the terminal end piece (8) to a flexible (Continued)

Figure 1:
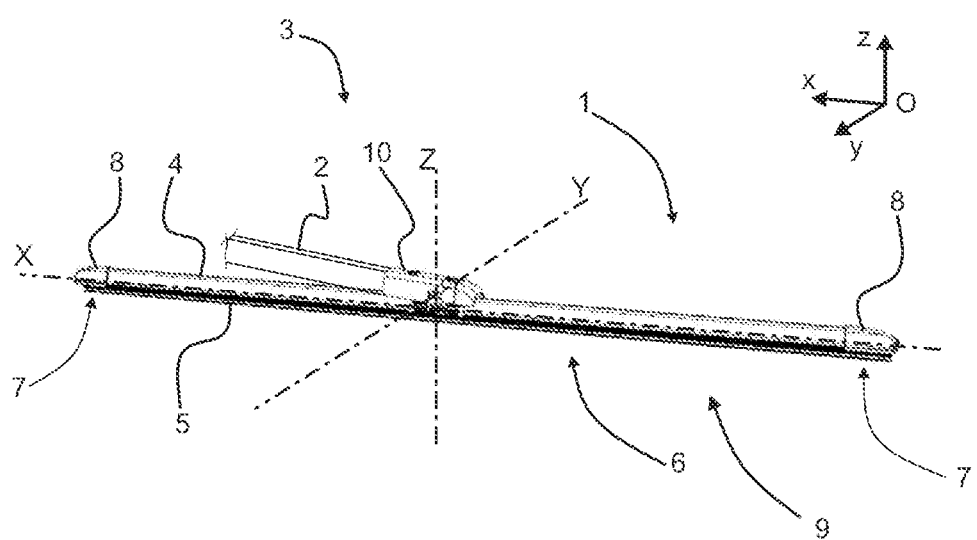

support (6) of the wiper blade (1). The locking member (37) extends at least from the peripheral wall (20) and comprises a stop (46) which is at least partially arranged in the first housing (21), the locking member (37) being configured so that the stop (46) can be displaced in a second plane (P2) transverse to the first plane (P1) when the first end (31) is introduced into the first housing (21).

10 Claims, 7 Drawing Sheets

(56) References Cited

U.S. PATENT DOCUMENTS

| 2013/0067676 A1* | 3/2013 | Yoshimoto | B60S 1/3889 |
| | | | 15/250.32 |
| 2014/0352099 A1* | 12/2014 | Fujiwara | B60S 1/3445 |
| | | | 15/250.34 |

\* cited by examiner

END PIECE FOR A WIPER BLADE

The field of the present invention is that of wiper systems with which a motor vehicle is intended to be provided. It relates to a terminal end piece constituting a wiper blade. It also relates to a wiper blade comprising such a terminal end piece.

A wiper system, generally referred to as a windscreen wiper, for a motor vehicle is intended to remove, by means of wiping, liquids and dirt which may disturb the view which a driver of the motor vehicle has of his environment. The windscreen wipers generally comprise a driver arm which carries out an angular back-and-forth movement about a rotation axis, and an elongate wiper blade which is provided with a scraper blade which is produced from resilient material. Rubbing against a, front or rear, glass surface of the motor vehicle, the scraper blade wipes the water and a given amount of dirt from it, then discharges them outside the field of vision of the driver.

Regardless of the configuration of the wiper blade, that is to say, whether it be a wiper blade comprising articulated calipers which retain the scraper blade in several separate zones, or a wiper blade which comprises at least one flexible support which retains the scraper blade over the entire length thereof, otherwise referred to as a "flat blade", the wiper blade is attached to a terminal portion of the driver arm by means of a connection device which comprises a connector which is mounted so as to be fixedly joined to the wiper blade.

At each of the longitudinal ends of the wiper blade in the "flat blade" variant thereof, the scraper blade and the flexible support are provided with a terminal end piece which contributes to fixed retention of the scraper blade and the flexible support between them.

The closest prior art is formed by document US2014/0352099 in which the terminal end piece is capable of receiving the longitudinal ends of two flexible supports and the longitudinal end of the scraper blade. To this end, the terminal end piece comprises a first housing and a second housing which are each capable of receiving a longitudinal end of one of the flexible supports. The terminal end piece comprises a third housing which is capable of receiving the longitudinal end of the scraper blade. Such a terminal end piece is configured to receive two flexible supports and it is not suitable for a wiper blade which uses a single flexible support.

The terminal end piece comprises a tongue which is arranged in a plane of a lower wall of the terminal end piece. More specifically, the lower wall comprises an opening inside which the tongue extends. The tongue comprises a first end which is connected to an edge of the opening and a second end which forms a stop with respect to a component of the wiper blade. The tongue is mounted so as to be able to be moved in rotation about a rotation axis which is located in the region of the edge of the opening which receives the tongue. As a result, the second end which forms the stop is capable of moving in rotation with a significant angular displacement as a result of the consequent length of the elongation portion located between the first end and the second end of the tongue. There is a resultant fragility of the tongue and this difficulty forms a first disadvantage of the prior art.

When the terminal end piece is placed on the terminal ends of the flexible supports, the tongue has a tendency to move towards the outer side of the terminal end piece. This movement presents a problem during the initial assembly of the wiper blade. This is because the terminal end piece is carried by an assembly device which interferes with the movement of the tongue. This forms a second disadvantage of the prior art.

Finally, when the terminal end piece is mounted on the flexible supports, the tongue is flush with the lower wall. It is therefore easy for a malicious individual to insert a tool below the tongue in order to remove it from the first housing and then to disengage the terminal end piece from the flexible supports. This forms a third disadvantage of the prior art. Such a terminal end piece requires improvement in order to avoid or prevent a disengagement of the terminal end piece from the flexible support.

An object of the present invention is to provide a robust terminal end piece whose arrangement prevents any disengagement of the terminal end piece from the flexible support, without damaging the terminal end piece.

The terminal end piece of the invention is further suitable for a wiper blade structure with a single flexible support. The blocking means thereof is configured not to impede the assembly process of the wiper blade.

A terminal end piece of the present invention is a terminal end piece for a wiper blade. The terminal end piece comprises a peripheral wall which separates an external environment of the terminal end piece from an internal space of the terminal end piece. The terminal end piece delimits a first housing which is arranged in the internal space and which extends primarily in a first plane, a second housing being interposed between the peripheral wall and the first housing, the terminal end piece comprising at least one locking member which is configured to connect the terminal end piece to a flexible support of the wiper blade.

According to the present invention, the locking member extends at least from the peripheral wall and comprises a stop which is at least partially arranged in the first housing, the locking member being configured so that the stop can be moved in a second plane transverse to the first plane.

It should be noted that the movement of the stop set out above takes place when the first end of the flexible support is introduced into the first housing.

The terminal end piece advantageously comprises at least one of the following features, taken alone or in combination:
- the terminal end piece is monobloc, it is, for example, produced during a single moulding operation,
- the locking member is arranged in a tongue,
- the first housing is configured to receive a first end of a flexible support of the wiper blade,
- the second housing is configured to receive a heel of a scraper blade of the wiper blade,
- the first housing and the second housing are delimited by at least one internal wall,
- the locking member comprises a base which extends from the peripheral wall to the internal wall,
- the locking member comprises a central body which is fixedly joined to the base which extends along an extension axis which forms with the first plane a first angle which is between 30° and 60°,
- the first angle is in the order of 45° plus or minus 10%,
- the locking member is generally in the form of a flattened "S" when viewed in the second plane,
- the locking member comprises a head which is fixedly joined to the central body and which is received inside the first housing,
- the head comprises the stop, the stop being intended to come into contact with a first edge which comprises a notch which is provided through the flexible support, a first length of the base is between 1% and 10% of a length of the locking member, the first length being taken in the second plane, a second length of the central body is between 75% and 85% of the length of the locking member, the second length being taken in the second plane, a third length of the head is between 1% and 15% of the length of the locking member, the third length being taken in the second plane, the head is mounted so as to be movable in rotation about a rotation axis which extends in the central body.

The invention also relates to a wiper blade which comprises such a terminal end piece, a scraper blade and a flexible support, advantageously a single support, comprising a first end accommodated inside the first housing.

The invention also relates to a wiper system which comprises a drive arm which is provided with a connection device having such a wiper blade.

Figure 2:
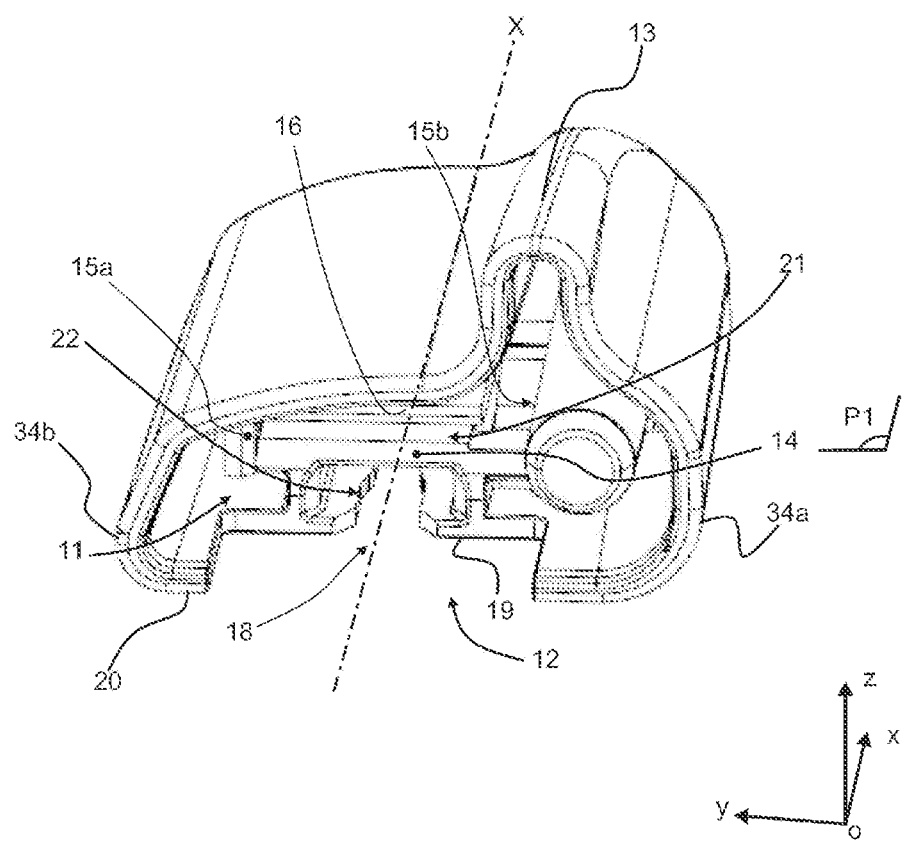
Figure 3:
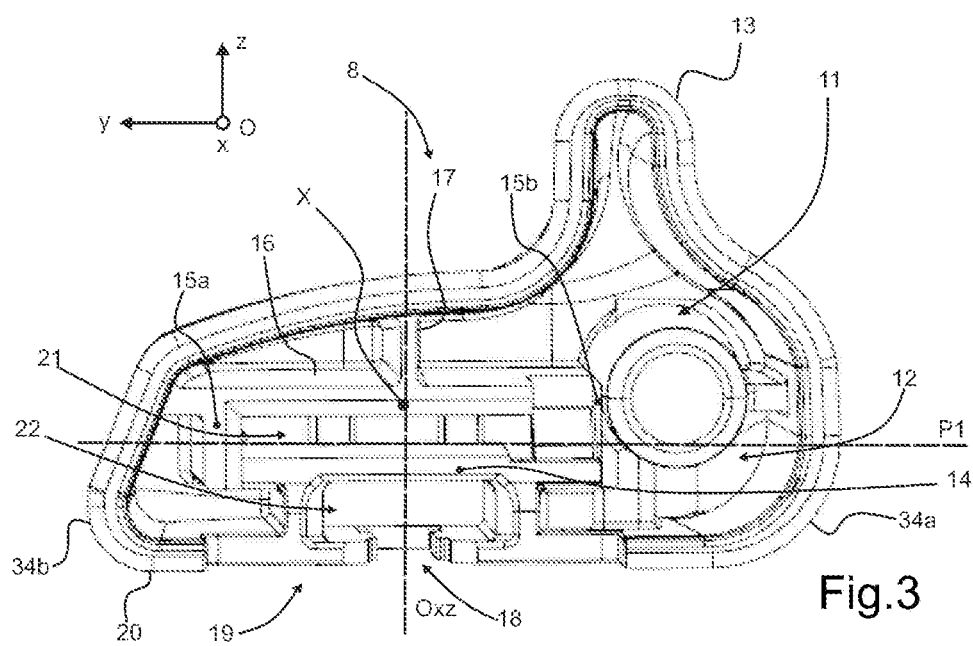
Figure 4:
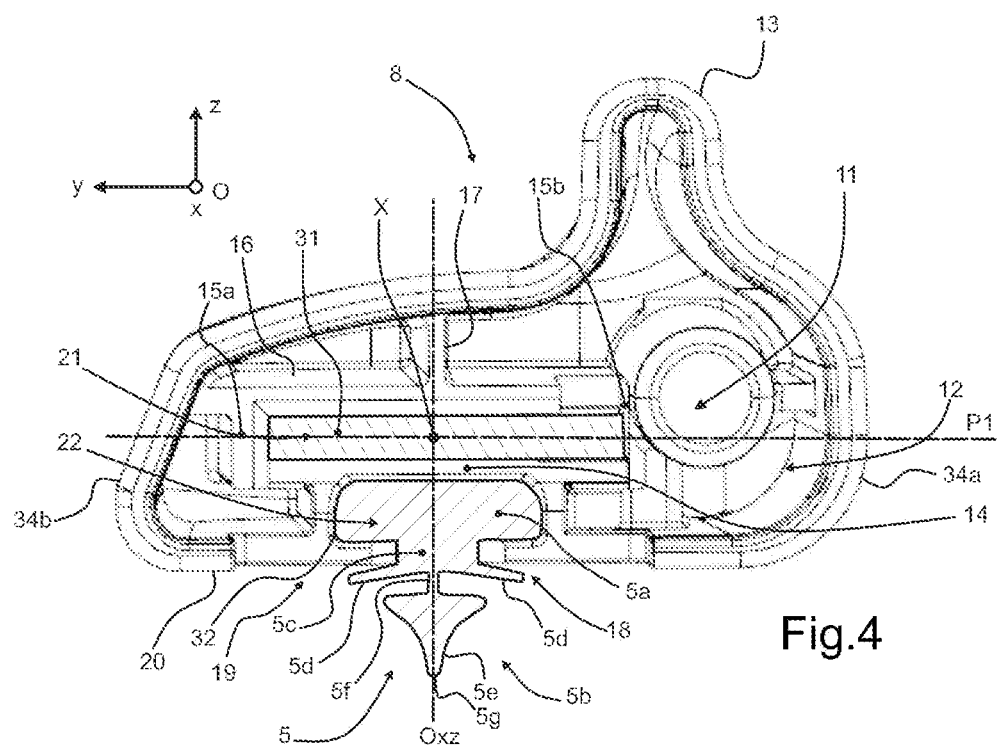
Figure 5:
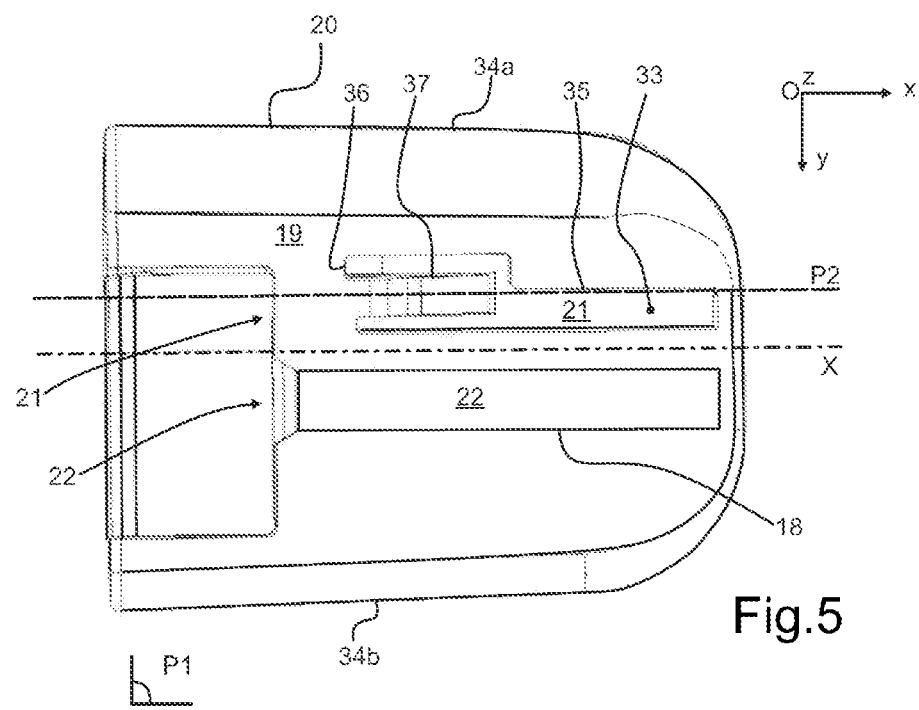
Figure 6:
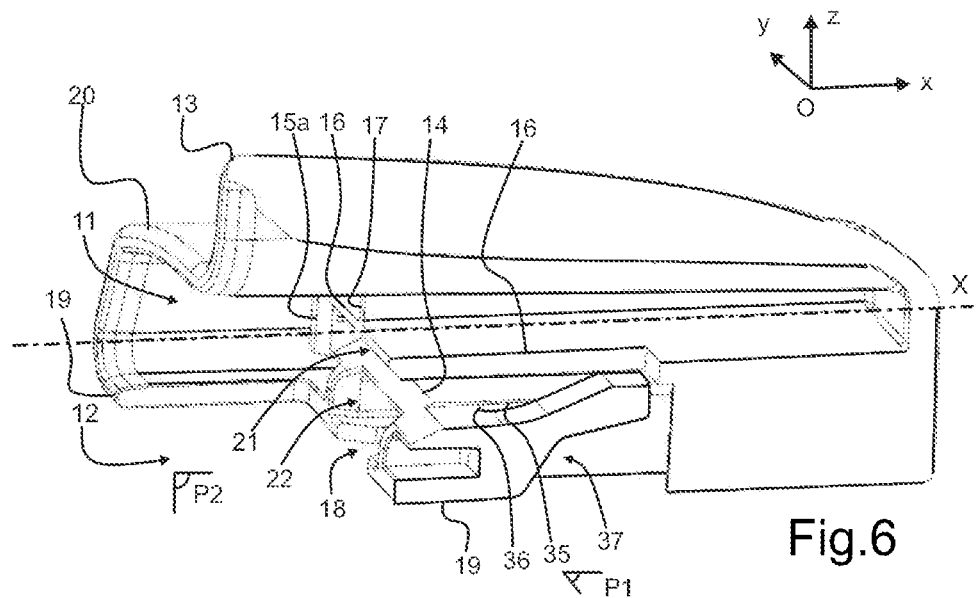
Figure 7:
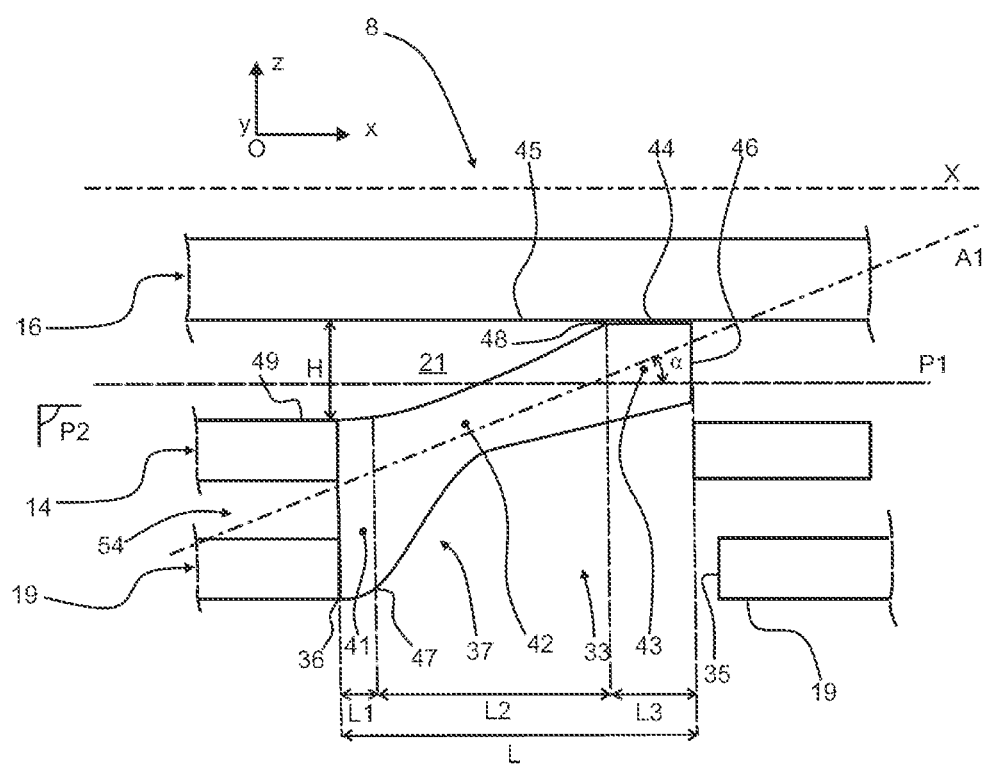
Figure 8:
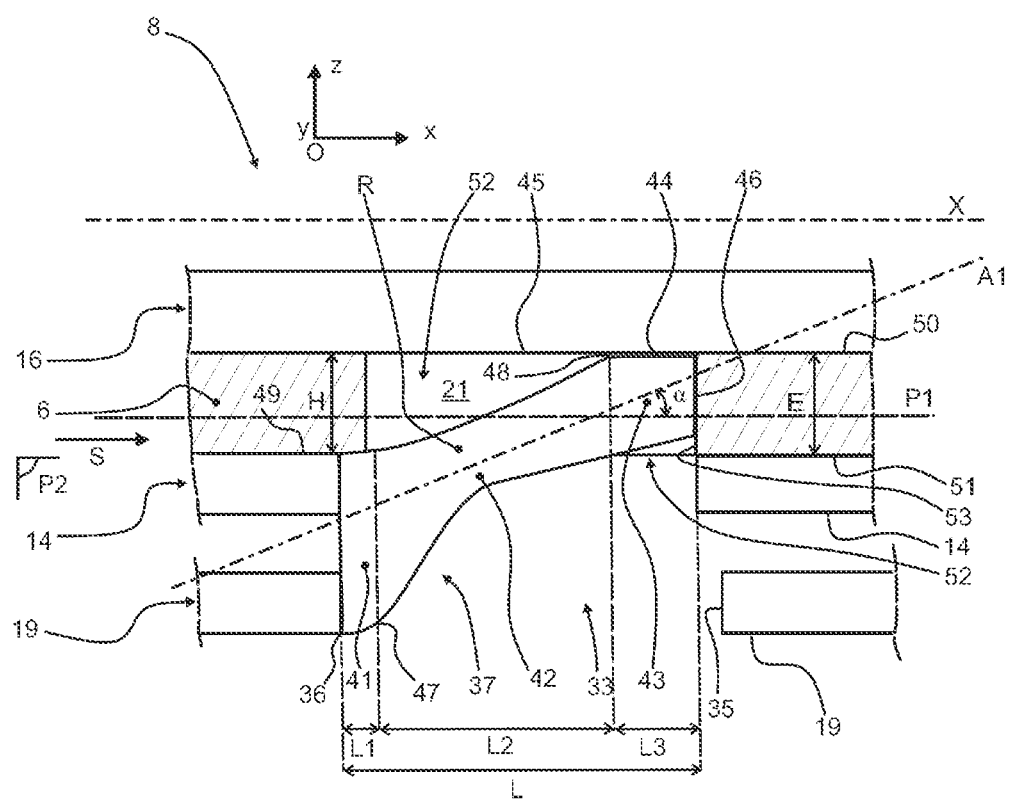
Figure 9:
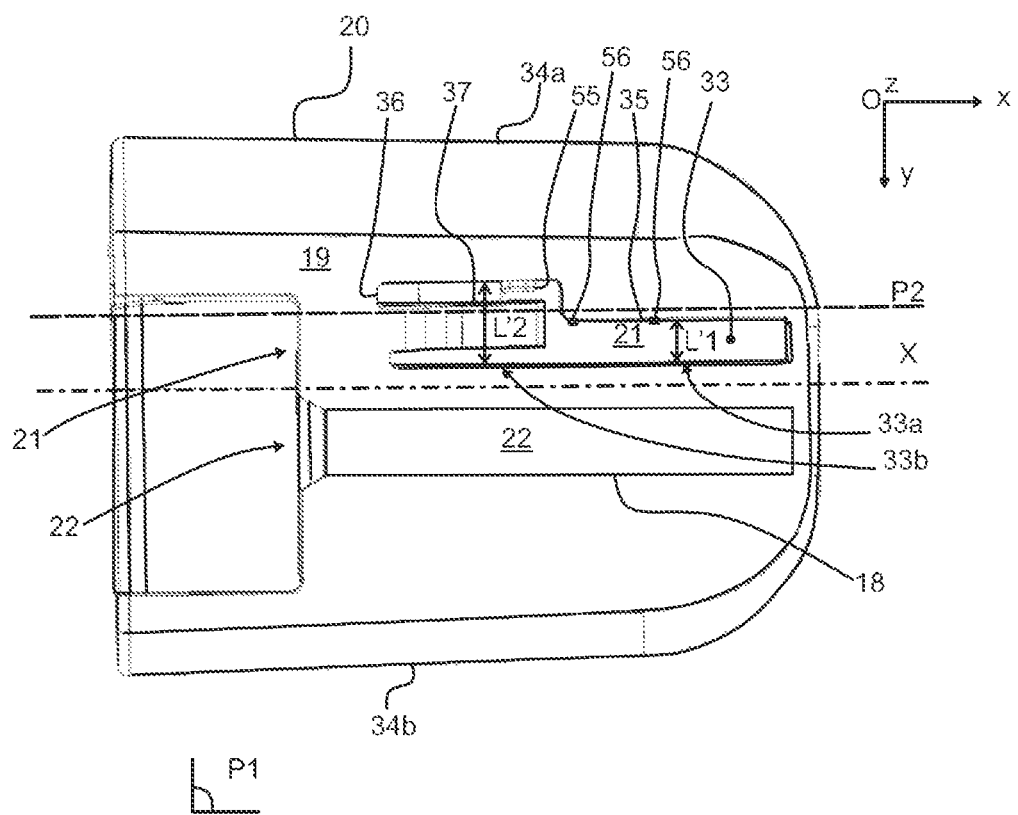

Other characteristics, details and advantages of the invention will be appreciated more clearly from a reading of the description given below by way of indication in relation to the drawings, in which:

FIG. 1 is a perspective view of a wiper system according to the invention,

FIG. 2 is a perspective view of a terminal end piece constituting the wiper system illustrated in FIG. 1, FIG. 3 is a front view of the terminal end piece illustrated in FIG. 2, FIG. 4 is a front view of the end piece illustrated in FIGS. 2 and 3, associated with a scraper blade and a flexible support, FIG. 5 is a bottom view of the terminal end piece illustrated in FIGS. 2 to 4, FIG. 6 is a partial section taken along a longitudinal plane of the terminal end piece illustrated in FIGS. 2 to 5, FIG. 7 is a schematic sectioned illustration taken along a longitudinal plane of a locking member which the terminal end piece illustrated in FIGS. 2 to 6 comprises, FIG. 8 is a schematic sectioned illustration taken along a longitudinal plane of the locking member which is illustrated in FIG. 7 and which is associated with a flexible support, FIG. 9 is a schematic illustration as a view from below of the terminal end piece illustrated in FIGS. 2 to 6.

It should first be noted that the Figures set out the invention in a detailed manner in order to implement the invention, the Figures naturally being able to be used to better define the invention if necessary.

In the Figures, the references longitudinal, transverse, vertical, lateral, left, right, upper, lower refer to the orientation in an orthonormal system Oxyz, which is connected to a terminal end piece 8 of the present invention which constitutes a wiper blade 1 illustrated in FIG. 1. In this reference system, the axis Ox represents the longitudinal direction, the axis Oy represents the transverse direction and the axis Oz represents the vertical direction of the object in question, regardless of whether this is the terminal end piece 8 or the wiper blade 1. In this reference system, a longitudinal plane is parallel with the plane Oxz, a transverse plane is parallel with the plane Oyz and a vertical plane is parallel with the plane Oxy. In this reference system, a longitudinal element extends along the axis Ox and a lateral element extends along the axis Oy. These references apply to the terminal end piece 8 alone or as part of the wiper blade 1 or to the wiper blade 1 provided with the terminal end piece 8, the constituent elements of the wiper blade 1 being assembled together partially or completely.

In FIG. 1, the wiper blade 1 of the present invention extends along a longitudinal axis X, parallel with the axis Ox. The terms lateral, left and right will be appreciated relative to a position along a transverse axis Y, parallel with the axis Oy, at one side and the other of the longitudinal axis X. A vertical axis Z indicates a vertical direction, parallel with that of the axis Oz, which is perpendicular to the longitudinal and transverse directions described above. The terms upper or lower refer to orientations along the vertical axis Z, the term lower containing the plane of the windscreen. For the longitudinal directions, the terms external or internal will be appreciated relative to a pivot location of the wiper blade 1 on a drive arm 2 of the wiper blade 1. the term internal corresponding to the portion where the drive arm 2 and a half-wiper extend, the term external corresponding to the portion where the other half-wiper extends.

A motor vehicle is generally equipped with a wiper system 3 in order to remove water and/or dirt present on a glass surface, in particular a rear window or a front windscreen of a motor vehicle. The wiper system 3 comprises the drive arm 2 which is capable of carrying out an angular back-and-forth movement along and above the glass surface.

The wiper system 3 also comprises the wiper blade 1 which extends along the longitudinal axis X. The wiper blade 1 comprises a scraper blade 5 and at least one air deflector 4. The air deflector 4 is provided to convert a pressure applied by a flow of air flowing along the glass surface into a force pressing the wiper blade 1 against the glass surface of the motor vehicle.

The scraper blade 5 is the component of the wiper blade 1 in direct contact with the glass surface in order to remove the water and/or dirt present thereon. The scraper blade 5 is, for example, a flexible blade produced from a resilient material, such as a polymer, in particular rubber. The wiper blade 1 also comprises a single flexible support 6, more particularly visible in FIG. 4, which provides the wiper blade 1 with a degree of deformation in the plane Oxz and a curved formation for optimised application of the wiper blade 1 against the glass surface.

The wiper blade 1 also comprises at each of the longitudinal ends 7 thereof the terminal end piece 8 of the present invention. Each terminal end piece 8 is provided to hold together the scraper blade 5 and the flexible support 6, such a terminal end piece 8 being able, for example, to cover a terminal portion of the air deflector 4. The flexible support 6 therefore extends from a first longitudinal end 7 of the wiper blade 1 to a second longitudinal end 7 of the same wiper.

According to the embodiment, the flexible support 6 is single and is, for example, a metal strip, otherwise referred to as a vertebra. Such a vertebra is advantageously single, at least when viewed in the plane Oxy.

The air deflector 4, the scraper blade 5 and the flexible support 6 form a semi-rigid structure 9 which is carried by a connection device 10 which is interposed between a terminal portion of the drive arm 2 and the semi-rigid structure 9. Such a connection device 10 comprises, for example, a connector which is fixedly joined at least in an isostatic manner to the semi-rigid structure 9, and an adapter which is connected via a pivot connection to the connector.

In FIGS. 2 to 4, the terminal end piece 8 is generally arranged in the manner of a shell which delimits an internal space 11 which is accessible via a passage 12. The terminal end piece 8 is delimited by a peripheral wall 20 which constitutes the outer casing of the terminal end piece 8. The passage 12 preferably extends inside a plane parallel with a transverse plane Oyz. The terminal end piece 8 comprises an upper edge 13 which is provided to accommodate a longitudinal end of a leading edge of the air deflector 4. The upper edge 13 generally extends in a vertical plane Oxz.

The terminal end piece 8 comprises at least two separate housings 21, 22, of which a first housing 21 is provided to receive a first longitudinal end 31 of the flexible support 6 and a second housing 22 is provided to partially receive a first longitudinal end 32 of the scraper blade 5, the longitudinal ends 31, 32 being more particularly visible in FIG. 4. The first housing 21 and the second housing 22 are separated from each other by an inner wall 14 common to these two housings the housings not communicating with each other. The first housing 21 and the second housing 22 each extend primarily in a respective plane parallel with the horizontal plane Oxy, extending along the longitudinal axis X. More specifically, the first housing 21 extends primarily in the first plane P1.

The first housing 21 and the second housing 22 are superimposed on each other along the longitudinal axis X, the first housing 21 being placed above the second housing 22, in a position for use of the wiper blade 1 on the motor vehicle. In this configuration, the first housing 21 is an upper housing and the second housing 22 is a lower housing. The first housing 21 and the second housing 22 open at the outer side of the terminal end piece 8 via the passage 12. Such a passage 12 affords access to the first housing 21 for the first longitudinal end 31 of the flexible support 6 and the second housing 22 for the first longitudinal end 32 of the scraper blade 5.

With more particular reference to FIG. 4, the scraper blade 5 comprises a heel 5a and a head 5b which are connected to each other by means of an intermediate body 5c. The second housing 22 is more particularly intended to receive the heel 5a of the scraper blade 5 in order to allow the head 5b of the scraper blade 5 to emerge from the terminal end piece 8. The heel 5a has, for example, a cross-section which complements the cross-section of the second housing 22. The cross-section of the heel 5a is in this instance generally rectangular in order to facilitate an insertion of the heel 5a inside the second housing 22, which also has a rectangular cross-section.

The head 5b comprises, for example, lateral arms 5d which are carried by the intermediate body 5c and a sharp tip 5e which is connected to the lateral arms 5d via a hinge 5f. The sharp tip 5e of the scraper blade 5 is provided to move over the glazed surface, a friction zone 5g of the sharp tip 5e coming into contact with the glass surface when the wiper blade 1 is placed on the glass surface. The friction zone 5g, at one side, and the heel 5a, at the other, each form an end of the scraper blade 5 when viewed in a plane Oxz. This plane which passes through the friction zone 5g and the heel 5a forms a longitudinal centre plane which symmetrically divides the scraper blade 5, as can be seen in FIG. 4.

The first housing 21 and the second housing 22 are preferably delimited by at least the inner wall 14 which constitutes the terminal end piece 8. This wall is common in that it delimits the two housings 21 and 22. The inner wall 14 extends inside a plane parallel with the horizontal plane Oxy between the first housing 21 and the second housing 22.

The first housing 21 is also delimited by at least one upright member, and preferably two upright members 15a, 15b, as illustrated in FIGS. 2 to 4. The upright members 15a, 15b are mutually parallel and parallel with a plane parallel with the plane Oxz and comprise a left upright member 15a and a right upright member 15b.

The first housing 21 is also delimited by an upper wall 16 which is parallel with the inner wall 14 and which is orthogonal to the upright members 15a, 15b. The upper wall 16 extends between the inner wall 14 and the peripheral wall 20 and is arranged above the inner wall 14.

The first housing 21 is bordered by the inner wall 14, the upright members 15a, 15b and the upper wall 16 which form guiding ramps during the insertion by means of sliding of the first end 31 of the flexible support 6 inside the first housing 21.

A reinforcement wall 17 extends between the first housing 21 and the peripheral wall 20 in order to carry the first housing 21 and the second housing 22 and to reinforce the inner structure of the terminal end piece 8.

The first housing 21 is laterally more extensive than the second housing 22 so that the first housing 21 completely overhangs the second housing 22.

The second housing 22 is provided with a channel 18. The channel 18 opens towards the outer side of the terminal end piece 8 and it is provided so as to extend parallel with the longitudinal axis X. The channel 18 enables communication between the second housing 22 and the outer side of the terminal end piece 8. This channel 18 is in the form of an aperture which is provided through a lower wall 19 of the terminal end piece 8. The lower wall 19 constitutes the peripheral wall 20 and forms the lower portion thereof which is arranged opposite the windscreen in a position for use of the wiper blade 1 on the motor vehicle.

The channel 18 at least partially receives the intermediate body 5c of the scraper blade 5, whilst the second housing 22 receives the heel 5a of the scraper blade 5, the head 5b being held outside the terminal end piece 8.

With reference to FIG. 5, the lower wall 19 is provided with an opening 33 which is laterally offset relative to the channel 18. It will be understood that the channel 18 is provided substantially at an equal distance from the lateral edges 34a, 34b, including a right lateral edge 34a and a left lateral edge 34b, of the terminal end piece 8, and that the opening 33 is interposed between the channel 18 and one of the lateral edges 34a, 34b, equally well the right lateral edge 34a or the left lateral edge 34b. The opening 33 and the channel 18 are longitudinally extended parallel with the longitudinal axis X. The opening 33 is delimited by an edge 35 which comprises a first portion 36 which extends perpendicularly to the longitudinal axis X. The first portion 36 is the portion of the edge 35 which is closest to the passage 12.

In FIG. 6, the first portion 36 constitutes the anchoring point of a locking member 37, which is in particular configured in the form of a tongue and which is intended to fix the flexible support 6 inside the first housing 21. The locking member 37 is arranged to prevent a longitudinal movement of the terminal end piece 8 relative to the flexible support along the longitudinal axis X. To this end, the locking member 37 is primarily arranged inside the first housing 21. It will be understood that a volume of the locking member 37 extends substantially inside the first housing 21 and is not arranged in the extension of the peripheral wall 20. As a result, the locking member 37 is generally received inside the first housing 21 and the locking member 37 cannot be moved by hand from the outer side of the terminal end piece 8. Consequently, once the first end 31 of the flexible support 6 is arranged inside the first housing 21, the flexible support 6 cannot be disassembled with an action on the locking member 37 as a result of the buried nature thereof inside the terminal end piece 8. It will also be understood that the peripheral wall 20 forms an obstacle counteracting an attempt to grip the locking member 37, for example, using a sharp object which a malicious user would attempt to place below the locking member 37 in order to remove it from the first housing 21. This elusive and non-grippable nature of the locking member 37 is obtained in particular from a geometric formation of the locking member 37 which is described below.

The locking member 37 is configured to turn or bend about a rotation axis and in a second plane P2 which is transverse, advantageously perpendicular, to the first plane P1 in which the first housing 21 primarily extends. The locking member 37 is therefore arranged on the terminal end piece 8 so that the rotation axis about which the locking member 37 rotates or bends is parallel with the first plane P1 which defines the first housing 21.

As illustrated in FIG. 7, the locking member 37 comprises successively a base 41, a central body 42 and a stop 43. The base 41, the central body 42 and the stop 43 are singled out below in order to better describe them but it will be understood that they are both formed by means of moulding and together form a monobloc assembly and that they are geometrically isolated below only in order to improve the understanding of their structure and their function.

The base 41 of the locking member 37 extends between the lower wall 19 and the inner wall 14. That is to say, the base 41 extends inside a plane parallel with the plane Oyz. The base 41 constitutes a connection element between the lower wall 19 and the inner wall 14.

The stop 43 comprises a retention face 44 which is in contact with an inner face 45 of the upper wall 16. The inner face 45 is the face of the upper wall which borders the first housing 21. As a result, the locking member 37 extends inside the first housing 21 from the peripheral wall 20 as far as the upper wall 16 passing through the first housing 21. More specifically, the locking member 37 originates on the lower wall 19 which constitutes the peripheral wall 20. In other words, the locking member 37 is accommodated inside the first housing 21 almost completely in order to prevent it from being gripped from the outer side of the terminal end piece 8.

The stop 43 also comprises a retention face 46 which is intended to come into contact with the flexible support 6 in order for it to be fixed in position and to prevent sliding in translation of the flexible support 6 along the longitudinal axis X. The retention face is provided along a plane parallel with the vertical plane Oyz.

The central body 42 extends along an extension axis A1 which is provided inside a plane parallel with the plane Oxz and which forms a first angle α between the longitudinal axis X and the extension axis A1 which is between 30° and 60°, and which is preferably in the order of 45°, plus or minus 5%.

The locking member 37 is in the form of a flattened "S", of which one end comprises the stop 43 and another end comprises the base 41.

The base 41 extends along a first length L1 taken parallel with the longitudinal axis X between the first edge 36 and a first inflection point 47 of a lower face 45 of the locking member 37. The lower face 45 is the face of the locking member 37 which is orientated towards the outer side of the terminal end piece 8. The first length L1 is between 1% and 10% of a length L of the locking member 37 taken between the first edge 36 and the retention face 46.

The central body 42 extends along a second length L2 taken parallel with the longitudinal axis X between the first inflection point 47 of the lower face 45 of the locking member 37 and a first engagement point 48 of the retention face 44. The first engagement point 48 is the point of the retention face 44 which is closest to the passage 12. The second length L2 is between 75% and 85% of the length L of the locking member 37.

The head 43 extends along a third length L3 taken parallel with the longitudinal axis X between the first engagement point 48 of the retention face 44 and the retention face 46. The third length L3 is between 1% and 15% of the length L of the locking member 37.

In FIG. 7, the locking member 37 has a height H taken parallel with the vertical axis Oz between an inner face 49 of the inner wall 14 and the lower face 45 of the upper wall 16 which is in the order of a thickness E of the flexible support 6. The inner face 49 of the inner wall 14 is that of the inner wall 14 which delimits the first housing 41. The thickness E of the flexible support 6 is taken parallel with the vertical axis Oz between two walls parallel with the vertical plane Oxy, including an upper surface 50 and a lower surface 51 which slide respectively against the lower face 45 of the upper wall 16 and the internal face 49 of the inner wall 14.

These arrangements are such that, when the first end 31 of the flexible support 6 is introduced inside the first housing 21 in an introduction direction S, illustrated in FIG. 8, the retention face 44 of the locking member 37 slides along the lower surface 51 of the flexible support 6 until the retention face 44 moves perpendicular to a notch 52 which the flexible support 6 comprises and which constitutes a housing for the head 43. In a position for use of the terminal end piece 8, the retention face 46 moves into abutment with a first edge 53 which comprises the notch 52 which is provided through the flexible support 6. The notch 52 is formed by at least one hole, for example, arranged at one side and the other of the flexible support 6 to receive the head 43 of the locking member 37.

The central body 42 and the head 43 of the locking member 37 are mounted so as to be movable in rotation about a rotation axis R which extends parallel with the transverse axis Oy and is accommodated inside the first housing 21. The rotation axis R is, for example, arranged between the base 41 and the central body 42. As a result, the rotation axis R of the locking member 37 is accommodated inside the internal space 11 which delimits the peripheral wall 20, which minimises a tilting of the locking member 37 and reinforces its solidity, whilst preventing its removal from the first housing 21, which ensures that it is impossible to separate the terminal end piece 8 and the flexible support 6.

Such a terminal end piece 8 can readily be produced by means of moulding, in particular from a plastics material, a clearance 54 being provided between the lower wall 19 and the inner wall 14 in order to facilitate a mould removal operation.

According to a construction variant illustrated in FIG. 9, the edge 35 is provided with a fluting 55 which is provided opposite the locking member 37 and more specifically opposite one of the lateral faces thereof in order to prevent torsion or rotation of the locking member about the longitudinal axis X and thus to reinforce the durability of the locking member 37.

According to a construction variant, the edge 35 is provided with at least one guiding member 56 of the flexible support 6 when it is introduced inside the first housing 21. Preferably, the guiding member(s) extend(s) along an axis orthogonal to the first plane P1.

According to another variant, the opening 33 comprises a first portion 33a which comprises a first width L'1 which is less than a second opening width L'2 which a second portion 33b of the opening 33 comprises, the second portion 33b being provided overhanging the locking member 37, the opening widths being taken parallel with the transverse axis Oy between two opposing edge portions 35.

Of course, various modifications may be made by the person skilled in the art to the assembly according to the invention which has been described above by way of non-limiting example since a form of the terminal end piece which is moulded simultaneously with the remainder of the terminal end piece 8 is used.

In any case, the invention is not limited to the embodiment specifically described in this document and extends in particular to all equivalent means and to any technically effective combination of these means.

The invention claimed is:

1. A terminal end piece for a wiper blade, the terminal end piece comprising:
    a peripheral wall which separates an external environment of the terminal end piece from an internal space of the terminal end piece,
    the terminal end piece delimiting a first housing which is arranged in the internal space and which extends primarily in a first plane, a second housing being interposed between the peripheral wall and the first housing; and
    at least one locking member which is configured to connect the terminal end piece to a flexible support of the wiper blade,
    wherein the locking member extends from the peripheral wall and comprises a stop which is at least partially arranged in the first housing, the locking member being configured so that the stop can be moved in a second plane transverse to the first plane,
    wherein the first housing and the second housing are delimited by at least one internal wall, and
    wherein the locking member comprises a base which extends from the peripheral wall to the internal wall.

2. The terminal end piece according to claim 1, wherein the first housing is configured to receive a first end of the flexible support of the wiper blade.

3. The terminal end piece according to claim 1, wherein the second housing is configured to receive a heel of a scraper blade of the wiper blade.

4. The terminal end piece according to claim 1, wherein the locking member comprises a central body which is fixedly joined to the base which extends along an extension axis which forms with the first plane a first angle which is between 30° and 60°.

5. The terminal end piece according to claim 4, wherein the first angle is 45° plus or minus 10%.

6. The terminal end piece according to claim 4, wherein the locking member comprises a head which is fixedly joined to the central body and which is received inside the first housing.

7. The terminal end piece according to claim 6, wherein the head comprises the stop, the stop being intended to come into contact with a first edge which comprises a notch which is provided through the flexible support.

8. The terminal end piece according to claim 6, wherein the head is mounted so as to be movable in rotation about a rotation axis which extends in the central body.

9. The terminal end piece according to claim 1, wherein the locking member is in the form of a flattened "S" when viewed in the second plane.

10. A wiper blade comprising:
    a terminal end piece comprising:
        a peripheral wall which separates an external environment of the terminal end piece from an internal space of the terminal end piece;
        the terminal end piece delimiting a first housing which is arranged in the internal space and which extends primarily in a first plane, a second housing being interposed between the peripheral wall and the first housing;
        at least one locking member which is configured to connect the terminal end piece to a flexible support of the wiper blade;
        wherein the locking member extends at least from the peripheral wall and comprises a stop which is at least partially arranged in the first housing, the locking member being configured so that the stop can be moved in a second plane transverse to the first plane;
        wherein the first housing and the second housing are delimited by at least one internal wall; and
        wherein the locking member comprises a base which extends from the peripheral wall to the internal wall;
    a scraper blade; and
    wherein the flexible support comprises a first end accommodated inside the first housing.

* * * * *